(12) United States Patent
Greer

(10) Patent No.: US 9,657,199 B2
(45) Date of Patent: May 23, 2017

(54) ANTI-FOAMING AGENTS FOR HOT-MELT ADHESIVES

(75) Inventor: Robert W Greer, Lexington, NC (US)

(73) Assignee: Flint Trading, Inc., Thomasville, NC (US)

(*) Notice: Subject to any disclaimer, the term of this patent is extended or adjusted under 35 U.S.C. 154(b) by 126 days.

(21) Appl. No.: 13/605,491

(22) Filed: Sep. 6, 2012

(65) Prior Publication Data
US 2013/0237654 A1   Sep. 12, 2013

Related U.S. Application Data

(60) Provisional application No. 61/531,421, filed on Sep. 6, 2011.

(51) Int. Cl.
| | | |
|---|---|---|
| *C09J 11/08* | (2006.01) | |
| *C08G 69/26* | (2006.01) | |
| *C08G 69/34* | (2006.01) | |
| *C08G 69/40* | (2006.01) | |
| *C09J 177/08* | (2006.01) | |

(52) U.S. Cl.
CPC ............ *C09J 11/08* (2013.01); *C08G 69/265* (2013.01); *C08G 69/34* (2013.01); *C08G 69/40* (2013.01); *C09J 177/08* (2013.01)

(58) Field of Classification Search
CPC ....... C09J 11/08; C09J 177/08; C08G 69/265; C08G 69/34; C08G 69/40
USPC .................................................. 524/261, 442
See application file for complete search history.

(56) References Cited

U.S. PATENT DOCUMENTS

| | | | | |
|---|---|---|---|---|
| 2,643,240 A * | 6/1953 | Walton et al. ..... | B01D 19/0409 516/123 | |
| 2,663,649 A | 12/1953 | Winkler | | |
| 2,992,195 A * | 7/1961 | Young et al. .............. | 528/339.3 | |
| 3,037,871 A | 6/1962 | Floyd et al. | | |
| 3,253,940 A | 5/1966 | Floyd et al. | | |
| 3,377,303 A * | 4/1968 | Vertnik et al. ............. | 528/339.3 | |
| 3,396,180 A | 8/1968 | Floyd et al. | | |
| 3,408,317 A | 10/1968 | Vertnik | | |
| 3,412,115 A | 11/1968 | Floyd | | |
| 2,886,543 A | 5/1969 | Perrmand et al. | | |
| 3,449,273 A | 6/1969 | Ketterning et al. | | |
| 3,483,237 A | 12/1969 | Peerman et al. | | |
| 3,499,853 A | 3/1970 | Griebsch et al. | | |
| 3,565,837 A | 2/1971 | Drawert | | |
| 3,595,816 A | 7/1971 | Barrett | | |
| 3,622,604 A | 11/1971 | Drawert | | |
| 3,637,550 A * | 1/1972 | Sprauer ......................... | 525/420 | |
| 3,652,469 A | 3/1972 | Glaser et al. | | |
| 3,776,865 A | 12/1973 | Glaser et al. | | |
| 3,781,234 A | 12/1973 | Drawert | | |
| 3,847,875 A | 11/1974 | Drawert | | |
| 4,045,389 A | 8/1977 | Drawert | | |
| 4,072,641 A | 2/1978 | Loeb et al. | | |
| 4,107,061 A | 8/1978 | Struwold et al. | | |
| 4,191,669 A | 3/1980 | Hinze et al. | | |
| 4,282,346 A | 8/1981 | Sharkey | | |
| 4,307,227 A | 12/1981 | Meyer et al. | | |
| 4,343,743 A | 8/1982 | Coquard et al. | | |
| 4,359,556 A | 11/1982 | Lakshmanan et al. | | |
| 4,571,267 A | 2/1986 | Drawert | | |
| 4,652,327 A | 3/1987 | Hayes et al. | | |
| 4,668,765 A | 5/1987 | Drawert | | |
| 4,791,164 A | 12/1988 | Wichelhaus et al. | | |
| 4,816,549 A | 3/1989 | Rumack | | |
| 4,853,460 A | 8/1989 | Harman | | |
| 4,882,414 A * | 11/1989 | Wroczynski ............... | 528/339.3 | |
| 4,912,196 A | 3/1990 | Leoni et al. | | |
| 4,914,162 A | 4/1990 | Leoni et al. | | |
| 5,091,572 A | 2/1992 | Speranza et al. | | |
| 5,138,027 A | 8/1992 | Van Beek | | |
| 5,138,097 A | 8/1992 | Speranza et al. | | |
| 5,154,760 A | 10/1992 | Miller et al. | | |
| 5,162,490 A | 11/1992 | Drawert | | |
| 5,214,124 A | 5/1993 | Drawert | | |
| 5,719,255 A | 2/1998 | Heucher et al. | | |
| 5,759,695 A | 6/1998 | Primeaux, II | | |
| 5,807,968 A | 9/1998 | Heinrich et al. | | |
| 5,914,362 A * | 6/1999 | Brecht et al. ................. | 524/268 | |
| 5,922,831 A | 7/1999 | Heinrich et al. | | |
| 5,952,281 A * | 9/1999 | Mondin et al. ............... | 510/365 | |
| 6,399,713 B1 | 6/2002 | MacQueen et al. | | |
| 6,426,379 B1 * | 7/2002 | Rudy et al. ................... | 524/265 | |
| 6,870,011 B2 | 3/2005 | MacQueen et al. | | |
| 7,294,653 B2 * | 11/2007 | Zeng ............................ | 516/124 | |
| 8,633,147 B2 * | 1/2014 | Paul et al. .................... | 510/347 | |
| 9,101,151 B2 * | 8/2015 | Kobzeff et al. | | |
| 2006/0111502 A1 | 5/2006 | Groeneveld et al. | | |
| 2010/0006217 A1 | 1/2010 | Slark et al. | | |
| 2011/0184099 A1 | 7/2011 | Hewel et al. | | |

FOREIGN PATENT DOCUMENTS

| | | |
|---|---|---|
| EP | 0334667 A2 | 9/1989 |
| EP | 554174 B1 | 4/2000 |
| WO | 2007112200 A1 | 10/2007 |

OTHER PUBLICATIONS

Chem-Tex Laboratories, Inc.; Certificate of Analysis: Defoamer GW-1, Jul. 29, 2014, Concord, NC.
Chem-Tex Laboratories Inc.; Material Safety Data Sheet: Defoamer GW-1, Mar. 2009, Concord, NC.
Chem-Tex Laboratories, Inc; Defoamer GW-1.

* cited by examiner

*Primary Examiner* — Nathan M Nutter
(74) *Attorney, Agent, or Firm* — Guerry L. Grune; ePatentManager

(57) ABSTRACT

A polyamide hot melt adhesive composition is described comprising the polyamide condensation product of substantially equimolar quantities of: (a) an acid component consisting essentially of one or more polymeric fatty acids and one or more dicarboxylic acids, and (b) an amine component consisting essentially of one or more cyclic aliphatic diamines, one or more non-cyclic aliphatic diamines in which the amine groups are bonded to odd-numbered carbon atoms on the aliphatic chain, and one or more alkylene diamines, and (c) an anti-foaming or defoaming agent comprised of a water based silicone compound comprising 5% solids in water wherein the defoaming agent reduces or eliminates foaming occurring during the condensation reaction providing the condensation product and (d) an acid based catalyst.

1 Claim, No Drawings

ANTI-FOAMING AGENTS FOR HOT-MELT ADHESIVES

PRIORITY

The following application claims benefit of U.S. Provisional Application No. 61/531,421 entitled, "Anti-Foaming Agents for Hot-Melt Adhesives", filed on Sep. 6, 2011. The entire contents of the application are hereby incorporated by reference.

BACKGROUND OF THE INVENTION

This disclosure relates to polyamide compositions useful as hot-melt adhesives. Specifically, the hot melt adhesives of the present disclosure are useful for bonding various materials and can be used together with or within specially formulated products.

One important and undesirable aspect during the polymerization of hot-melt adhesives compositions is the amount of foaming that accompanies the reaction. Minimizing this foaming activity by the use of anti-foaming or defoaming agents and more specifically the composition and required concentration of these anti-foaming or defoaming agents used during polymerization of these hot melt adhesives, is a primary focus of the present disclosure.

RELEVANT ART

There are many disclosures in the art relating to polyamide compositions having hot-melt adhesive properties and the methods for preparing such compositions. A poly(ester-amide) adhesive composition having a long open assembly time is disclosed in U.S. Pat. No. 4,485,233. This patent discloses poly(ester-amide) adhesive compositions comprising the product of polymerization of (a) from 10 to 60 equivalent percent of a polymeric fatty acid, and (b) from 40 to 90 equivalent percent of a dicarboxylic acid, with a substantially equivalent amount of (c) from 40 to 90 equivalent percent of an organic diamine and (d) from 10 to 60 equivalent percent of a diol. The organic diamine component (c) may comprise a linear aliphatic, cycloaliphatic or aromatic diamine, and, disclosed as the preferred diamines, are piperazine, 1,3-dipiperidyl propane and diamines with an odd number of carbon atoms such as 1,3-diaminopropane.

Representative of other prior art adhesive compositions are those described in U.S. Pat. Nos. 3,377,303 and 3,444,026 to Peerman, et. al. The latter compositions comprise the reaction product of a dimer fatty acid and a wide variety of diamines. Copolymerizing dicarboxylic acids, including aliphatic dicarboxylic acids such as adipic, sebacic and azelaic acids, are also disclosed as components of the adhesive compositions.

Polyamide compositions useful as hot-melt adhesives for adhering vinyl plastics are also disclosed in U.S. Pat. No. 3,847,875. The latter compositions are the reaction product of 1, 8 or 1,9-heptadecane dicarboxylic acid and specific heterocyclic diamines such as piperazine. Copolymerizable dicarboxylic acids such as azelaic, sebacic and adipic acids are also disclosed as components of the adhesives.

One of the unique properties regarding these polymeric hot melt adhesives is that because of the relative weight of the di-carboxylic acid molecule (the "dimer"), the dimer acid plays a highly dominate role in influencing the properties and cost of these polymers. Their early popularity was driven by the fact that 80% of the weight of these polymers came from low-cost plant and animal oils that were heated and processed to produce the di-acid. Later, General Mills and others discovered that one could make a di-amine from the same base materials instead of a di-acid by reacting the dimeric fat acid with ammonia under nitrile-forming conditions. After purification, the dinitrile is then hydrogenated to form the corresponding diamine which is also purified. To make a polyamide, this molecule would then be reacted with an organic di-acid, such as sebacic or azelaic acid.

Later, it was discovered that a variety of useful materials could be produced by keeping the same essential fatty acid based portion of the polyamide, but by adding one or more co-acids and one or more different amines or by modifying the polymerization process. Through a variety of co-monomers one can produce the following range of properties of the polyamides, all based on fatty acid molecules:

Improving printing/flexographic ink performance
Printing and publishing applications
Specific textile adhesive and dying applications.
Changing or improving solubility in various solvents including water
Improving mechanical properties and/or adhesion
Jet printing inks for modern day inkjet printers
Improved Gardner Color
Changing the electrical polarization and polarizability
Improved UV stability
Thermosets
Improved water stability
Rubber-like Elastomers
Improved open time
Copolymers with polyethers
Improving the polymerization process for personal care products
Mixed resins such as polyamide-polyesters, phenol-formaldehydes, and polyolefins The work effort beginning in the 1940's and continued through the decades of the 1970's and beyond, led to the creation of general classes of these polyamides. Current work has been aimed at developing these classes of materials and focusing on achieving performance gains that include; enhancing the reaction conditions and reproducibility, increased solubility in preferred solvents and improvements in mechanical properties.

A summary of the preparation of polymeric fat acids is found in U.S. Pat. No. 3,157,681. Commercially available polymeric fat acids so prepared from tall oil fatty acids generally have a composition as follows:

Percent by wt,
C18 monobasic acids (monomer) 5-15
CS6 dibasic acids (dimer) 60-80
C54 and higher polybasic acids (trimer) 10-35

The relative ratios of monomer, dimer, and trimer in such unfractionated polymeric fat acids me dependent on the nature of the starting material and the conditions of polymerization. For the purposes of this invention, the term "monomeric fat acids" refers to the unpolymerized monomeric acids, the term "dimeric fat acids" refers to the dimeric fat 'acids, and the term "trimeric fat acids" refers to the residual higher polymeric forms consisting primarily of trimer acids but containing some higher polymeric forms. The term "polymeric fat acids" as used herein is intended to be generic to polymerized acids obtained from "fat acids" and consists of a mixture of monomeric, dimeric, and trimeric fat acids. The term "fat acids" is intended to include saturated, ethylenically unsaturated and acetylenically unsaturated, naturally occurring and synthetic monocarboxylic aliphatic acids containing from 8 to 24 carbon atoms.

The saturated fat acids are generally polymerized by somewhat different techniques than those described in U.S. Pat. No. 3,157,681, but because of the functional similarity of the polymerization products, they are considered equivalent to those prepared by the methods described as applicable to the ethylenically and acetylenically unsaturated fat acids. While saturated acids are difficult to polymerize, polymerization can be obtained at elevated temperatures with a peroxidic catalyst such as di-t-butyl peroxide. Because of the generally low yields of polymeric products, these materials are not currently commercially significant. Suitable saturated fat acids include branched and straight chain acids such as caprylic acid, pelargonic acid, capric acid, lauric acid, myristic acid, palmitic acid, isopalmitic, stearic acid, arachidic acid, behenic acid and lignoceric acid.

The ethylenically and acetylenically unsaturated fat acids which may be polymerized and their method of polymerization are described in the above-mentioned U.S. Pat. No. 3,157,681.

Reference has been made hereinabove to the monomeric, dimeric and trimeric fat acids present in the polymeric fat acids. The amounts of monomeric fat acids, often referred to as monomer, dimeric fat acids, often referred to as dimer, and trimeric or higher polymeric fat acids, often referred to as trimer, present in polymeric fat acids may be determined by conventional gas-liquid chromatography of the corresponding methyl esters. Another method of determination is a micromolecular distillation analytical method. This method is that presented initially by R. F. Paschke et al., J. Am. Oil Chern. Soc., XXXI (No. 1), 5 (1954), wherein the distillation is carried out under high vacuum (below 5 microns) and the monomeric fraction is calculated from the weight of product distilling at 155° C., the dimeric fraction calculated from that distilling between 155° C. and 250° C., and the trimeric (or 25 higher) fraction is calculated based on the residue. Unless otherwise indicated herein, this analytically method was that employed in the analysis of the polymeric fat acids employed in this invention. When the gas-liquid chromatography technique is employed, a portion intermediate between monomeric fat acids and dimeric fat acids is seen, and is termed herein merely as "intermediate," since the exact nature thereof is not fully known. For this reason, the dimeric fat acid value determined by this method is slightly lower than the value determined by the micro molecular distillation method. Generally, the monomeric fat acid content determined by the micromolecular distillation method will be somewhat higher than that of the chromatography method. Because of the difference of the two methods, there will be some variation in the values of the contents of various fat acid fractions. Unfortunately, there is no known simple direct mathematical relationship correlating the value of one technique with the other.

As earlier indicated, the polymeric fat acids employed to prepare the polyamides used in this invention have a dimeric fat acid content in excess of 65% by weight and preferably in excess of 80-85% by weight. Such polymeric fat acids are obtained by fractionation by suitable means such as high vacuum distillation or by solvent extraction techniques from polymeric fat acids having lower dimeric fat acid contents, such as the common commercially available products described earlier.

The amine amide-forming derivative of the polymeric fat acids, a dimeric fat diamine, sometimes referred to as "dimer diamine," "dimeric fat amine," or "polymeric fat acid diamine," are the diamines prepared by amination of dimeric fat acids. Reference is made thereto in U.S. Pat. No. 3,010,782. As indicated therein, these are prepared by reaction polymeric fat acids with ammonia to produce the corresponding nitriles and subsequently hydrogenating the nitriles to the corresponding amines. Upon distillation, the dimeric fat diamine is provided which has essentially the same structure as a dimeric fat acid except that the carboxyl groups are replaced by —CH2NH2 groups. Further, this diamine is also described in Research and Development Products Bulletin, CDS 2-63 by General Mills, Inc., Jun. 1, 1963, as "Dimer Diamine" illustrated by the formula H2N-D-NH2 where D is a 36-carbon hydrocarbon radical of a dimeric fat acid.

The polyamides are prepared by heating the reactants at temperatures in the range of 100 to 300 degrees Centigrade for from 3 to 30 hours, the last 1 to 4 hours being conducted under vacuum or reduced pressure (0.5-25 mm. Hg). A typical heating schedule is as follows:

Heating up to 250° C. over about 2 hours and maintaining the temperature at about 250° C. for 2-4 hours at atmospheric pressure followed by 2-4 hours under vacuum as described above at 250° C. In general, the reactants are preferably heated over 200° C. and maintained at from 200 to 300° C. (preferably 250 to 275° C.) for about 3-4 hours, the last 1 to 2 hours under vacuum. All of the polyamide resins employed herein were prepared in this general manner which comprises general known amidification conditions.

Essentially molar equivalent amounts of carboxyl groups (a ratio of carboxyl to amine groups of essentially 1:1) are employed in preparing the polyamide. This will provide a polyamide which is essentially balanced or neutral, i.e, one in which the acid number and amine number is essentially equal. A slight excess of amine or acid groups may be employed; however, the ratio of amine to carboxyl groups is preferably maintained between 0.9:1 to 1.1:1. Under such conditions both the acid numbers and amine number will desirably be less than 35 and preferably will be less than about 20. Desirably, the acid or amine number will not exceed the corresponding acid or amine number by more than 25 units and preferably will not exceed by more than about 15 units.

While the presence of any amount of the compound, for example, piperazine:

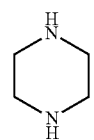

will provide some improvement in adhesion to vinyl, it is preferred that this compound provide from about 20-90 equivalent percent of the total amine groups employed and more preferably from about 25 to 75 equivalent percent. Optimum adhesion to vinyl resins is achieved with the use of about 45 to 65 equivalent percent. It is preferred that the amide-forming derivative of the polymeric fat acid contribute about 40 to 85 equivalent percent of the amide-forming functional groups contributed by the polymeric fat acid derivative. With the dicarboxylic amide-forming derivatives of a polymeric fat acid, it is preferred that from 50 to 75 equivalent percent of the total carboxylic groups employed be provided by the polymeric fat acid derivative. The remaining carboxyl groups will then be supplied by another difunctional, dicarboxylic amide-forming derivative, to which reference has previously been made hereinabove. This other derivative will then provide from 15 to 60 and preferably from about 25 to 50 equivalent percent of the total carboxyl groups employed. Where the amine amide-forming derivative of a polymeric fat acid is employed, it is preferred that this amine functioning derivative provide about 45-70 equivalent percent of the total amine groups employed. As discussed earlier hereinabove, if only the amine amide-forming derivative of a polymeric fat acid is employed, the carboxyl groups for polyamide formation will necessarily be supplied by a different difunctional dicarboxylic amide-forming derivative which necessarily will provide all or 100 equivalent percent of the carboxyl groups employed. Where mixtures of the dicarboxylic and amine amide-forming derivatives of the polymeric fat acid are employed, this other dicarboxylic amide-forming derivative will provide the remainder of the carboxyl groups, not supplied by the carboxylic amide forming derivative of the polymeric fat acid. When a copolymerizing diamine is employed, in addition to the compound with the carboxylic amide-forming derivatives of the polymeric fatty acid, this copolymerizing diamine will contribute the remainder of the necessary amine groups not supplied by the compound on the order preferably of 10 to 90 equivalent percent and more preferably about 25 to 75 equivalent percent of the total amine groups employed.

SUMMARY

The compositions of the present disclosure basically are comprised of a condensation product of substantially equimolar quantities of:

(a) an acid component consisting essentially of one or more polymeric fatty acids and one or more dicarboxylic acids, and (b) an amine component consisting essentially of one or more cyclic aliphatic diamines, one or more non-cyclic aliphatic diamines in which the amine groups are bonded to odd-numbered carbon atoms on the aliphatic chain, and, optionally, one or more additional organic diamines and (c) at least 0.01 wt. percent of a silicone based composition in a water base at a silicone concentration of 5% or more, and where the anti-foaming or defoaming agent comprised of a water based silicone compound comprising 5% solids in water wherein said defoaming agent reduces or eliminates foaming occurring during the condensation reaction providing said condensation product and wherein said anti-foaming or defoaming agent reduces said foaming by at least a multiple of twenty in comparison with condensation reactions not using said anti-foaming agent.

(d) An (optional) acid based catalyst at 0.01 to 0.05 weight percent including phosphoric acid as well as other weak acids such as acetic acid and oxalic acid.

For purposes of this disclosure, a weak acid is an acid that dissociates incompletely. It does not release all of its hydrogens in a solution, donating only a partial amount of its protons to the solution. These acids have higher pKa than strong acids, which release all of their hydrogen atoms when dissolved in water.

In one embodiment of the present invention, the use of a water based silicone emulsion with the tradename CT-GW1®, which is manufactured by Chem-Tex of Concord, N.C. has been shown to essentially eliminate any foaming during the condensation reaction.

Specifically, the optimal condensation reaction occurs with initial water formation at between 130 and 150 degrees Centigrade. In typical reactions, water generates foaming and the foam rises in the reaction vessel. If this foam reaches the top of the reaction vessel, it can interfere with the operation of various reactor components, such as the mixing shaft or the condenser. In order to compensate for high foaming reactions, the reactor must be charged at less than 50% capacity by weight or volume.

Surprisingly, it has been found that the addition of a very small concentrations of the water based silicone emulsion when added to the condensation reaction, will completely eliminate or greatly reduce foaming, which is otherwise prevalent and occurs with the condensation polymerization reactions required to synthesize the proper polyamides of the present disclosure.

DETAILED DESCRIPTION

The components required for polymerizing the polyamide compositions of the present invention are all well known in the art, as are methods for preparing them. The polymeric fatty acids, sometimes referred to in the art as "dimer acids", are complex mixtures resulting from the polymerization of fatty acids. Representative polymeric fatty acids are those commercially available from the polymerization of tall oil fatty acids.

The relative ratios of monomer, dimer and trimer in unfractionated polymeric fatty acids are dependent on the nature of the starting material and the conditions of polymerization. Methods for the polymerization of fatty acids are described, for example, in U.S. Pat. No. 3,157,681, which is hereby incorporated by reference.

A wide variety of dicarboxylic acids may also be employed together with the polymeric fatty acids in the preparation of the compositions of the present application. These include aliphatic, cycloaliphatic and aromatic dicarboxylic acids. Representative of such acids, which may contain from 2 to 20 carbon atoms, include oxalic, glutaric, malonic, adipic, succinic, azelaic, sebacic, dodecanedioic and pimelic acids. Methods of preparing these preferred acids are well known, and they are readily available commercially. Preferred dicarboxylic acids employed in this invention are straight chain aliphatic diacids having at least six carbon atoms and, more preferably, six to twelve carbon atoms, such as azelaic and sebacic acids, which are most preferred. It should be understood that use of the corresponding acid anhydrides, esters and acid chlorides of thee acids is included in the term "dicaboxylic acid".

The ratio of equivalents polymeric fatty acid to equivalents dicarboxylic acid in the acid component is preferably within the range of about 20:80 to 80:20, and more preferably within the range of about 30:70 to 40:60.

The use of an amine component which comprises at least partially a cyclic aliphatic diamine and at least partially a non-cyclic aliphatic diamine as defined above is a feature which distinguishes the polyamides of this invention over those known in the art and which, tests indicate, lends to these compositions their long open assembly times. The cyclic aliphatic diamines which may be used in this invention may be homocyclic such as, for example, 2,2-bis-(4-aminocyclohexyl) (4',4'-cyclohexylamine)propane, isophorone diamine, and cyclohexanebis-(methylamines), or may preferably be heterocyclic, such as piperazine or 1,3-dipiperidyl propane.

The non-cyclic aliphatic diamines which form component of the amine component are non-cyclic diamines in which the amine groups are bonded to odd-numbered carbon atoms on the aliphatic chain. Thus, for example, diamines with amine groups located at positions 1,3, 1,5, 1,7, and 1,9, to name just a few examples, would be included. There is no limit on the number of carbon atoms in the aliphatic diamine other than availability; generally such diamines having from three to nine carbon atoms are available. Specific examples of suitable diamines include 5-methyl-1,9-nonanediamine and the preferred diamines, 1,3 diaminopropane, 2-methyl-1,5-pentanediamine (e.g., Dytel A®, available from Du Pont Company, Wilmington, Del.), and 1,5-diaminopentane.

The organic diamines which optionally form the third component of the overall amine component may be one or more of the linear aliphatic, cycloaliphatic or aromatic diamines having from about 2 to 20 carbon atoms. Preferred especially are the alkylene diamines. Illustrative of the preferred diamines are ethylene diamine, 1,4-diaminobutane diamine, and 1,6-hexamethylene diamine. Also preferred are dimer diamines such as Humco DP-3695 and the polyglycol diamines such as Jeffamine Registered TM D-2000 available from Texaco and Polyglycol diamine H-221 available from Union Carbide Corporation. Tests indicate that the incorporation of from about 1 to 20% equivalents, based on total equivalents amine component, of polyglycol diamine can improve the low temperature impact resistance of the compositions.

The relative equivalent amounts of cyclic diamine and non-cyclic aliphatic diamine in the overall amine component of the polyamide can be varied to achieve a polyamide with the desired long open assembly time, e.g., at least 45 seconds when measured as described below. For example, the greater the quantity of non-cyclic aliphatic diamine used, the lesser the quantity of cyclic diamine is desired. Generally speaking, the amine component comprises about 25 to 75% equivalents of cyclic diamine and about 1 to 45% equivalents of noncyclic aliphatic diamine. Preferably, the amine component also comprises about 10 to 70% equivalents of organic diamine which is preferably ethylene diamine.

The preferred polyamide compositions of this invention comprise at least the following;

I. Acid Component 30-40% equivalents polymeric fatty acid 70-60% equivalents dicarboxylic acid selected from azelaic acid, sebacic acid, dodecanedioic acid and mixtures thereof 0.01 to 0.05 wt % acid catalyst such as phosphoric acid or equivalent weak acids II. Amine Component 45-60% equivalents piperazine 5-25% equivalents 2-methyl-1,5-pentanediamine or 1,5-diaminopentane 10-40% equivalents ethylene diamine.

III. Anti-Foaming or Defoaming Agent

A water based silicone emulsion composition in a weight percent of at least 0.01 weight percent based on the total weight of the polymerization components (I and II above).

The relative quantities of acid and amine components are selected so that substantially equivalent numbers of reactive carboxyl and amine groups are present in the reaction mixture to produce a neutral or balanced polyamide, i.e., the acid and amine numbers are substantially equal. Slight excesses of carboxyl or amine are acceptable, however, and the term "substantially equimolar" as used herein to refer to the relative quantities of acid and amines is intended to encompass such excesses. The ratio of carboxyl to amine or amine to carboxyl is preferably maintained between 0.9:1 and 1.1:1 so that acid and amine numbers will be less than 35, and preferably less than 20. Amine and acid numbers may be measured by conventional titrametric analytical techniques and are usually given as milligrams of potassium hydroxide per gram of product.

The techniques and general method of polymerizing the mixed reactants is generally well known; see, for example, U.S. Pat. Nos. 3,377,303 and 4,343,743. In general, the polyamides of this invention may be prepared by charging a resin kettle with the reactants, in proportions as hereinabove described, and heating the mixture to a temperature at which random polymerization occurs. In general, the reactants are heated to a temperature of from about 130° C. to 160° C. to initiate polymerization, and thereafter at a temperature sufficient to distill off the water of condensation. Preferably, the heating is carried out under an inert gas atmosphere such as under a blanket of nitrogen gas. To assist the polymerization, a polymerization catalyst may be added in a catalytic proportion, a representative of such catalysts include phosphoric acid. The heating of the reaction mixtures may be carried out until a selected viscosity of the reaction mixture is reached, e.g., 500-100,000 cps at 190° C., and preferably 2500-25,000 cps at 190° C. In addition, small amounts (0.5 to 10 eq. %) of a saturated linear carboxylic acid containing 5-20 carbons such as, for example, stearic and palmitic acid, or other reactive monomers such as phenyl benzoate or triphenylphosphite may be added to the mixture to control molecular weight and viscosity.

The addition of the anti-foaming agent when the reactor is charged with all reactants or just prior to the initialization of polymerization to prevent and/or eliminate foaming, is necessary to ensure simple and reproducible manufacturing processing.

The following examples will serve to best illustrate further the spirit and scope of the present invention. These examples are not to be construed as limiting, but merely serve as illustrations of the invention. Percentages and parts are by weight unless otherwise indicated. Also for convenience in illustration, the polymeric fat, or the amide-forming derivatives thereof, in the examples are polymerized tall oil fatty acids except where otherwise indicated. The compositions in these examples were made by the general procedure outlined above.

EXAMPLES OF PREPARATION OF POLYAMIDES

Example 1

To a four-necked 3000-ml flask was equipped with stirring system, condenser, nitrogen gas inlet, and thermocouple, 1351 g of dimer acid, 15.0 g of stearic acid, 85.0 g of sebacic acid, 156.0 g ethylenediamine and 34.0 g of Jeffamine D230 added. The reactants were heated from 25.0° C. to 250° C. gradually, with stirring and under nitrogen. This temperature was initially maintained for at least 5-8 hours, more preferably 10-20 hours of heating is required. During the last 4 hours, the reaction was conducted under vacuum. The addition of the anti-foaming agent (water-based) silicone emulsion was 0.82 grams.

The resulting polyamide exhibited the following properties:

Acid Value 7.3 mg KOH/g
Amine Value 0.78 mg KOH/g
Softening point 161.0° C.
Viscosity 6,528 cps at 190° C.

Example 2

To a four-necked 3000-ml flask was equipped with stirring system, condenser, nitrogen gas inlet, and thermocouple, 1115.5 g of dimer acid, 15.0 g of stearic acid, 106.4 g of sebacic acid, 68.5 g ethylenediamine, 110.7 g of piperazine, and 335.0 g of Jeffamine D2000 was added. The reactants were heated from 25.0° C. to 250° C. gradually, with stirring and under nitrogen. This temperature was maintained for at least 5-8 h, more preferably 10-20 hours of heating is required. During the last 4 hours, the reaction was conducted under vacuum. The addition of the anti-foaming agent (water-based) silicone emulsion was 0.88 grams.

This polyamide exhibited the following properties
Acid Value 8.3 mg KOH/g
Amine Value 0.49 mg KOH/g
Softening point 132.0° C.
Viscosity 6,148 cps at 190° C.

It should be understood that although examples are given it should not be construed that these are given only as examples and that variations of the invention are possible while adhering to the inventive concept herein disclosed.

What is claimed is:

1. A polyamide hot melt adhesive composition comprising the polyamide condensation product of substantially equimolar quantities of:
   (a) an acid component consisting essentially of one or more polymeric fatty acids and one or more dicarboxylic acids, and
   (b) an amine component consisting essentially of one or more cyclic aliphatic diamines, one or more non-cyclic aliphatic diamines in which the amine groups are bonded to odd-numbered carbon atoms on the aliphatic chain, and one or more alkylene diamines, and
   (c) an anti-foaming or defoaming agent comprised of a water based silicone compound said water based silicone compound being an emulsion comprising 0.01 wt % of a silicone based composition in a water base with a silicone concentration of 5% or more wherein said defoaming agent reduces or eliminates foaming occurring during the condensation reaction providing said condensation product and wherein said anti-foaming or defoaming agent reduces said foaming by at least a multiple of twenty in comparison with condensation reactions not using said anti-foaming agent
and
   (d) an acid based catalyst
wherein the ratio of equivalents of polymeric fatty acid(s) to equivalents of dicarboxylic acid(s) is in the range of about 20:80 to 80:20 and wherein said dicarboxylic acid is a straight chain aliphatic acid having at least six carbon atoms, wherein said dicarboxylic acid is selected from the group consisting of azelaic acid, sebacic, dodecanedioic acid and mixtures thereof where the cyclic aliphatic diamine is piperazine where the non-cyclic aliphatic diamine is selected from 2-methyl-1,5-pentadiamine, 1,5-diaminopentane or mixtures thereof and wherein said amine component comprises about 25 to 75% equivalents of cyclic diamine, about 1 to 45% equivalents of noncyclic aliphatic diamine, and about 10 to 70% equivalents of alkylene diamine wherein said percent equivalents of cyclic aliphatic diamine, based on total equivalents amine component, is in the range of about 45% to about 60% wherein said percent equivalents of non-cyclic aliphatic diamine, based on total equivalents of amine component, is in the range of about 5 to 25% wherein said amine component comprises ethylene diamine wherein said percent equivalents of ethylene diamine, based on total equivalents amine component, is in the range of about 10 to 40%.

* * * * *